(12) United States Patent
Chen

(10) Patent No.: US 6,229,710 B1
(45) Date of Patent: May 8, 2001

(54) COMPUTER MAIN BOARD CASE

(75) Inventor: Feng-Ming Chen, Chung Ho (TW)

(73) Assignee: Chenbro Micom Co., Ltd., Taipei Hsien (TW)

( * ) Notice: Subject to any disclaimer, the term of this patent is extended or adjusted under 35 U.S.C. 154(b) by 0 days.

(21) Appl. No.: 09/407,097

(22) Filed: Sep. 28, 1999

(30) Foreign Application Priority Data

Nov. 13, 1998 (TW) .................................................. 87218831
Nov. 13, 1998 (TW) .................................................. 87218832

(51) Int. Cl.[7] ................................ H05K 7/00; H05K 7/14
(52) U.S. Cl. ...................... 361/759; 361/753; 361/756; 361/801; 361/802; 211/41.17; 206/706
(58) Field of Search ...................................... 361/752–759, 361/796–802, 683, 686; 70/58; 211/41.17; 206/706; 220/4.02

(56) References Cited

U.S. PATENT DOCUMENTS

| | | | |
|---|---|---|---|
| 5,724,231 | * | 3/1998 | Winick et al. ........................ 361/759 |
| 5,835,343 | * | 11/1998 | Johns et al. .......................... 361/818 |
| 6,088,232 | * | 7/2000 | Ho ........................................ 361/754 |
| 6,118,668 | * | 9/2000 | Scholder et al. ..................... 361/753 |

* cited by examiner

Primary Examiner—Jayprakash N. Gandhi
(74) Attorney, Agent, or Firm—Rosenberg, Klein & Lee

(57) ABSTRACT

A computer main board case including a main base seat. Lateral sides of the main base seat are disposed with upright boards. The upper edges of the upright boards are formed with flanges having latch slots. The edge of the base frame is formed with latch hooks and latch forks for respectively latching in the latch slots of the upright boards and clamping the upper and lower faces of the flanges so as to latch and mount the base frame on the first and second upright boards of the main base seat. The surface of the main base seat is formed with two guide channels and a stopper section. The bottom face of the main board base seat is formed with two guide channels slidably fitted with the guide channels of the main base seat, whereby the main board base seat and the main board mounted thereon are movable relative to the main base seat. A shifting lever is pivotally disposed on the bottom face of the main board base seat. The shifting lever has a cam section at one end. In an operation position, the shifting lever is moved out from the bottom face of the main board base seat with the cam section pressing the stopper section of the main base seat to force the main board base seat to move out of the main base seat, whereby the main board can be easily extracted out from the connector of the upright printed circuit board.

3 Claims, 9 Drawing Sheets

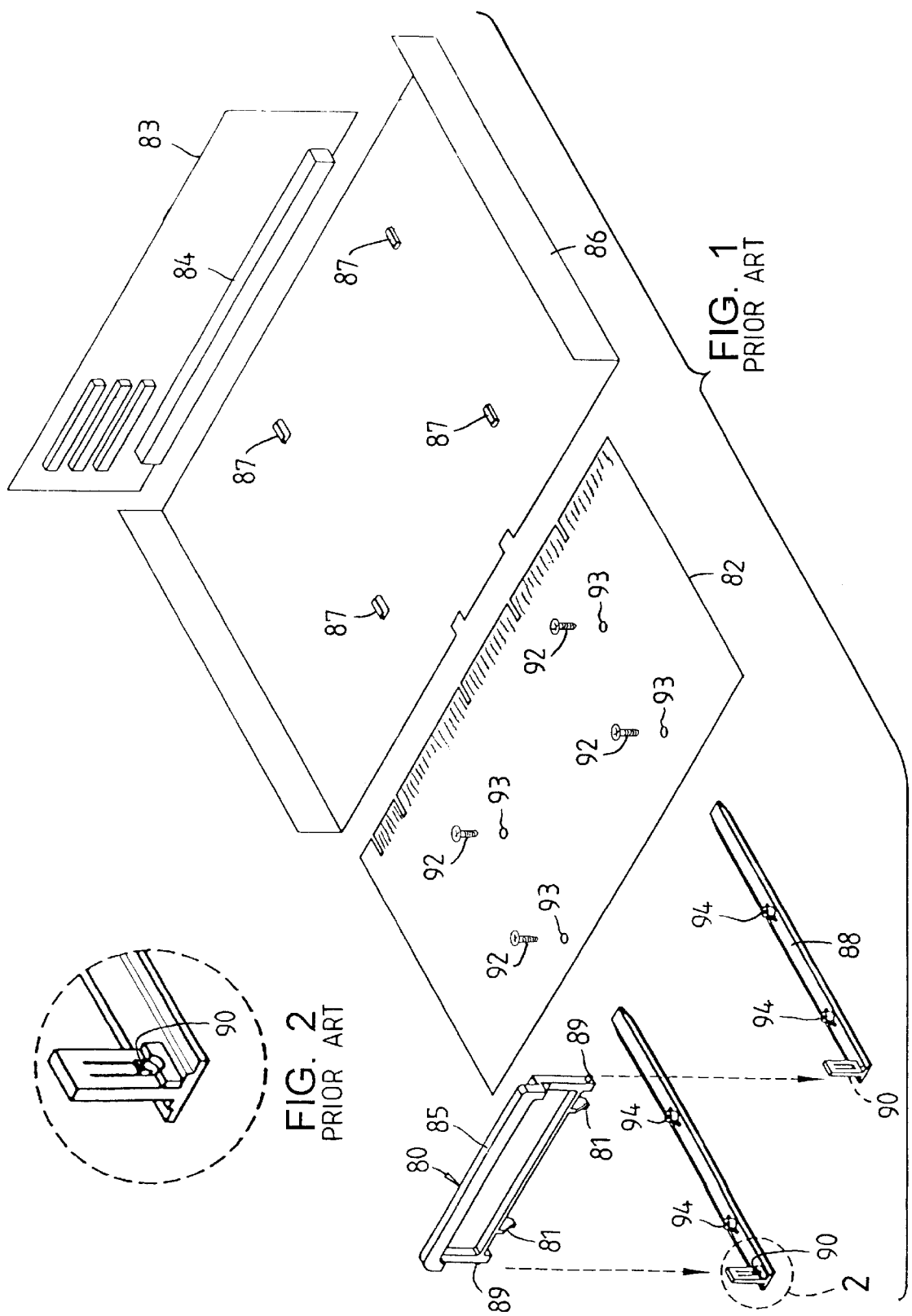

COMPUTER MAIN BOARD CASE

BACKGROUND OF THE INVENTION

The present invention relates to an improved computer main board case, and more particularly to a structure for easily pulling out the computer main board and a structure for easily assembling and disassembling the components of the computer main board case.

It often takes place that a personal computer user replaces central processing unit (CPU) as necessary so as to promote the function of the computer. Therefore, it is quite necessary to design the computer main board case with a structure enabling the user to easily draw out the main board with the CPU from the computer main board case. In addition, in accordance with the different requirements of the consumers or in response to the varied price of the CPU on market, the computer manufacturers often will not insert and mount the CPU on the main board. This is left to the retailer or wholesale merchant who according to the order of the customer installs the CPU on the main board and then deliver the personal computer product to the customer.

In order to satisfy the above two requirements, it is important to such design the computer main board case is such designed as to be easily assembled and disassembled so as to facilitate installation of the CPU on the main board or replacement of the CPU.

FIGS. 1 to 3 show a conventional measure in which the insertion depth and strength of the main board on the riser card connector socket are quite large. The pivot pins 89 of two sides of a rotary handle 80 are respectively pivotally connected in the pivot holes 90 of a slide bar 88. When extracting the main board 82 out of the insertion socket of the connector 84 of the riser card 83, the handle is rotated in the direction of the arrow 91, making the unplugging member 81 abut against the edge of the computer case so as to extract the main board 82 out of the insertion socket of the connector 84 of the riser card 83. Under limitation of the extremely small gap between the main board 82 and the computer case, the length of the unplugging member 81 to the handle 85 is very short. This leads to a short operation distance of each rotation of the handle 85. However, the the insertion socket of the connector 84 of the riser card 83 has a quite deep insertion depth. Therefore, each rotational operation of the handle 85 can hardly effectively totally extract the main board 82 out of the insertion socket of the connector 84 of the riser card 83.

In addition, the slide channels on the main board case 86 are defined by four lugs 87 rather than continuous slide channels. This has no problem in pulling the main board 82 out of the main board case 86 from the installation position. However, when installing the main board 82 back into the main board case 86, it is difficult to perform the installation. This is because that when trying to slide the slide bar 88 into the non-continuous slide channels defined by the four lugs 87, it often takes place that the slide bar 88 can be hardly aligned with the lugs 87 and fail to be slided into the slide channels.

Moreover, the two slide bars 88 are separately independent components and interconnected with each other by four screws 92 respectively passed through the through holes 93 of the main board 82 and tightened in the locking holes 94 of the slide bars 88. However, the two slide bars 88 still are not integrally connected to form a single part. Therefore, when pulling the handle 85 for pulling out the main board 82 in the direction of the arrow 91, the slide bars 88 are unsmoothly slided within the slide channels defined by the lugs 87.

Also, in order to facilitate the assembly and disassembly of the computer main board case, a great number of tenons and mortises are employed. For example, the base frame for mounting the floppy disc drive and CD ROM is connected with the main board case by tenons and mortises. However, the existing base frame and main board case are associated a riding manner. In case of dropping, the base frame is apt to detach from the main board case. For solving this problem, the manufacturers of the main board case will additionally lock the base frame by screws to prevent the base frame from detaching from the main board case. However, this leads to the problem of difficult disassembly and assembly.

SUMMARY OF THE INVENTION

It is therefore a primary object of the present invention to provide an improved computer main board case in which the case cover can be easily disassembled from the main base seat and firmly assembled on the main base seat.

It is a further object of the present invention to provide the above computer main board case in which both the main board base seat and main board can be easily extracted out from the computer main board case.

It is still a further object of the present invention to provide the above computer main board case in which the first guide channels formed on the surface of the main base seat and the second guide channels formed on the main board base seat and slidably fitted with the first guide channels are all integrally formed continuous guide channels, so that the main board base seat and the main board can be smoothly slided in or out.

It is still a further object of the present invention to provide the above computer main board case in which the base frame for mounting the floppy disc drive or CD ROM is formed with latch hooks on one edge and latch forks on another edge for firmly securing the base frame on the first and second upright boards of the main base seat.

According to the above objects, the computer main board case of the present invention includes: a main base seat, a surface of the main base seat being formed with continuous first guide channels and a stopper section, lateral sides of the main base seat being disposed with a first upright board, a second upright board and a third upright board, an upper edge of the first upright board being formed with a first flange having first latch slots, the second upright board being formed with a second flange and continuous second latch slots; a main board base seat, a bottom face of the main board base seat being formed with second guide channels slidably fitted with the first guide channels, whereby the main board base seat is movable relative to the main base seat, a computer main board being secured on the main board base seat, one side of the main board base seat being formed with a fourth upright board having third latch slots; a shifting lever pivotally disposed on the bottom face of the main board base seat, the shifting lever having a cam section, in a non-operation position, the shifting lever being hidden under the bottom face of the main board base seat, while in an operation position, the shifting lever being moved out from the bottom face of the main board base seat with the cam section pressing the stopper section of the main base seat to force the main board base seat to move out of the main base seat; a base frame, one edge of the base frame being disposed with latch hooks latched in the latch slots of the first flange of the first upright board, another edge of the base frame being disposed with latch forks clamping the upper and lower faces of the second flange of the second upright board so as to mount the base frame on the first and second upright boards of the main base seat; and a case cover including a board body and fifth upright boards downward extending from two opposite sides of the board body to form a U-shaped cover body, an inner side of the fifth upright board being disposed with latch hooks for respectively hooking and latching with the second latch slots of the second upright board of the main base seat and the third latch slots of the fourth upright board of the main board base seat.

The present invention can be best understood through the following description and accompanying drawings, wherein:

BRIEF DESCRIPTION OF THE DRAWINGS

FIG. 1 is an exploded view of a conventional measure;

FIG. 2 is a partially enlarged view of area 2 of FIG. 1;

DETAILED DESCRIPTION OF THE PREFERRED EMBODIMENT

Figure 3:
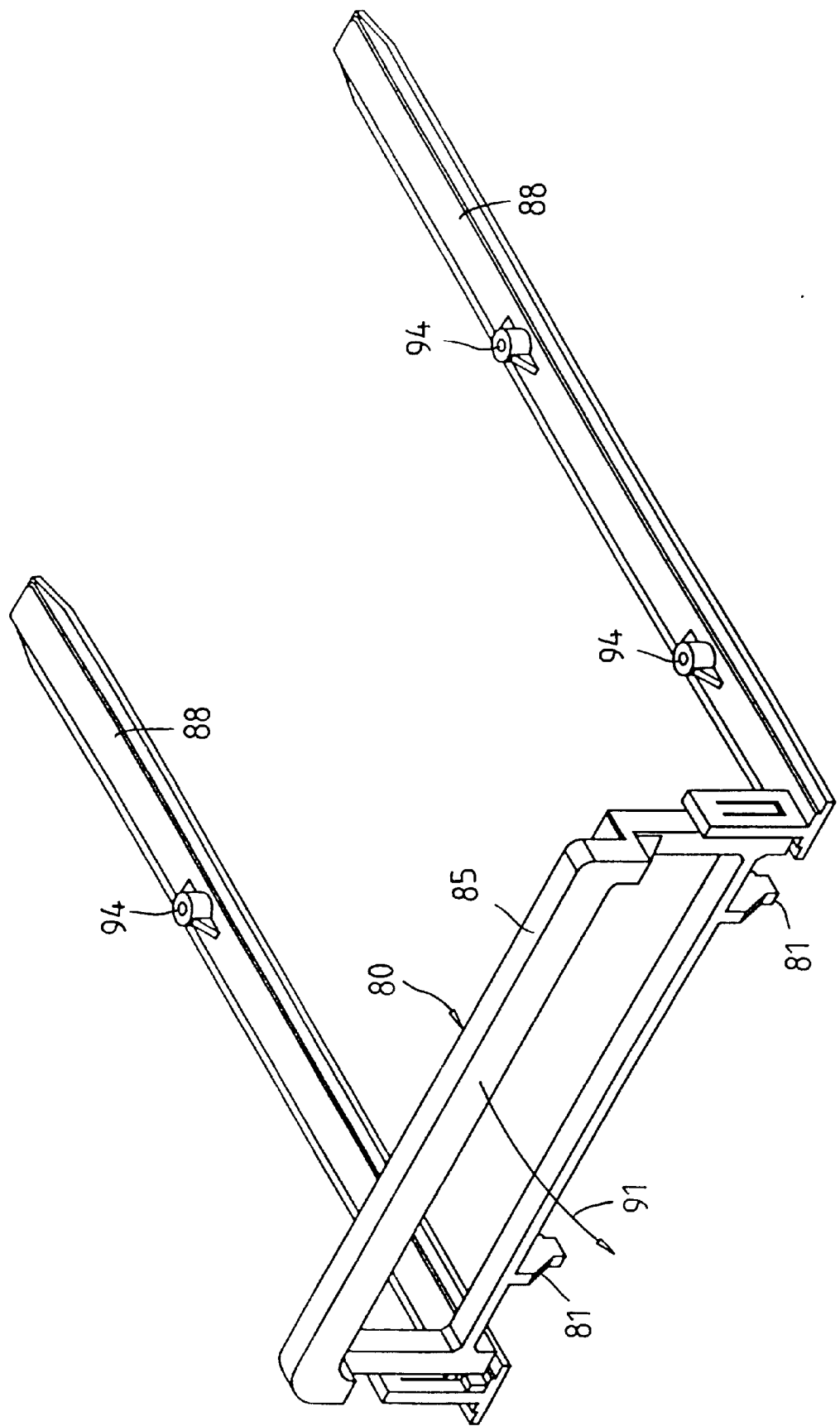
FIG. 3 is a partially assembled view of FIG. 1.

Please refer to FIGS. 4 to 10. The disassembling structure 10 for computer main board of the present invention includes a main base seat 11, a main board base seat 21, a shifting lever 31, a base frame 41 and a case cover 51.

Referring to FIGS. 4 to 7, the surface of the main base seat 11 is formed with first guide channels 12, 13 and a stopper section 14. The lateral sides of the main base seat 11 are disposed with a first upright board 15, a second upright board 16 and a third upright board 26. An upper edge of the first upright board 15 is formed with a first flange 17 having first latch slots 18. The second upright board 16 is formed with a second flange 19 and second latch slots 20.

Figure 4:
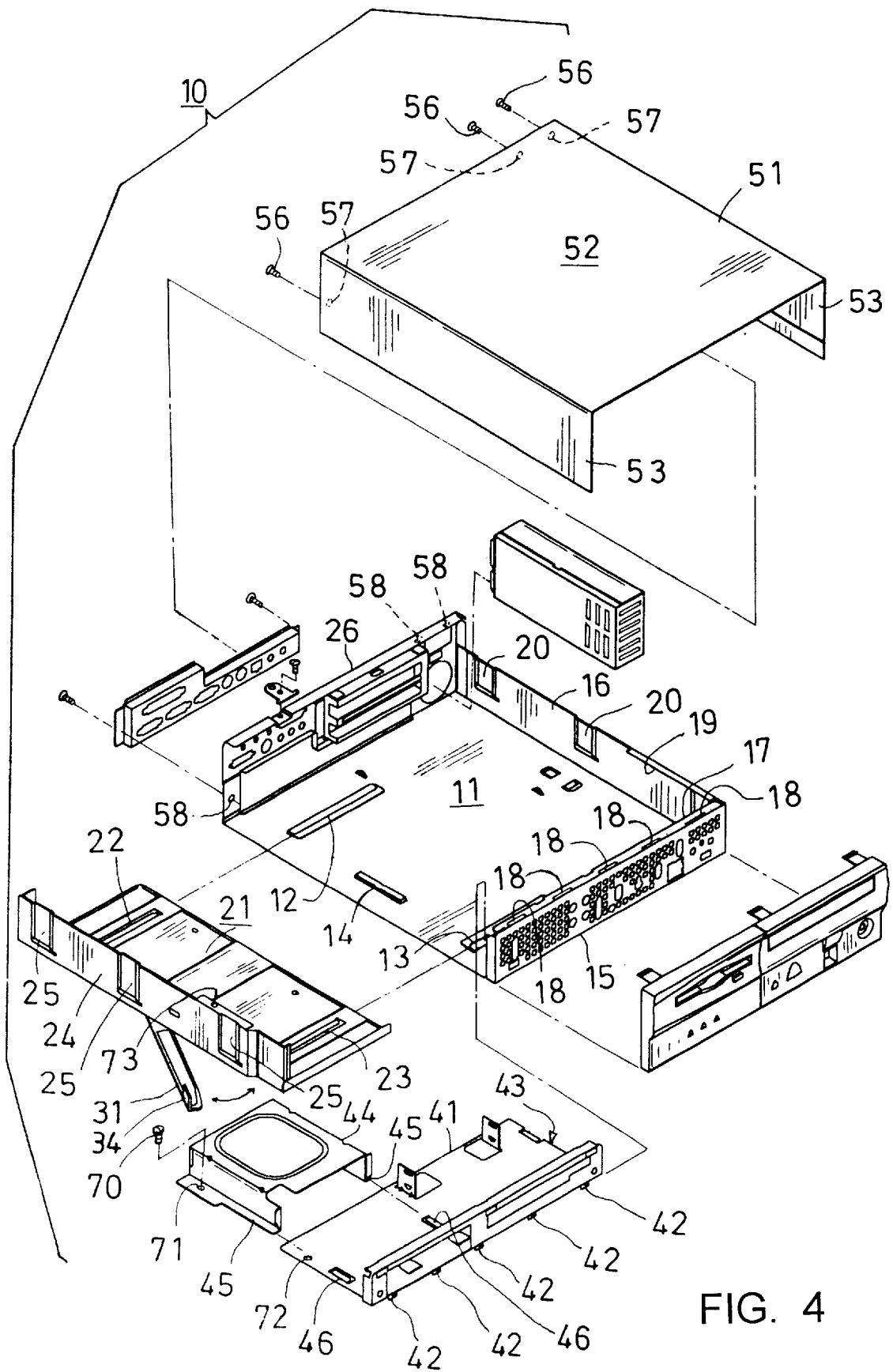
FIG. 4 is a perspective exploded view of the present invention.
Figure 5:
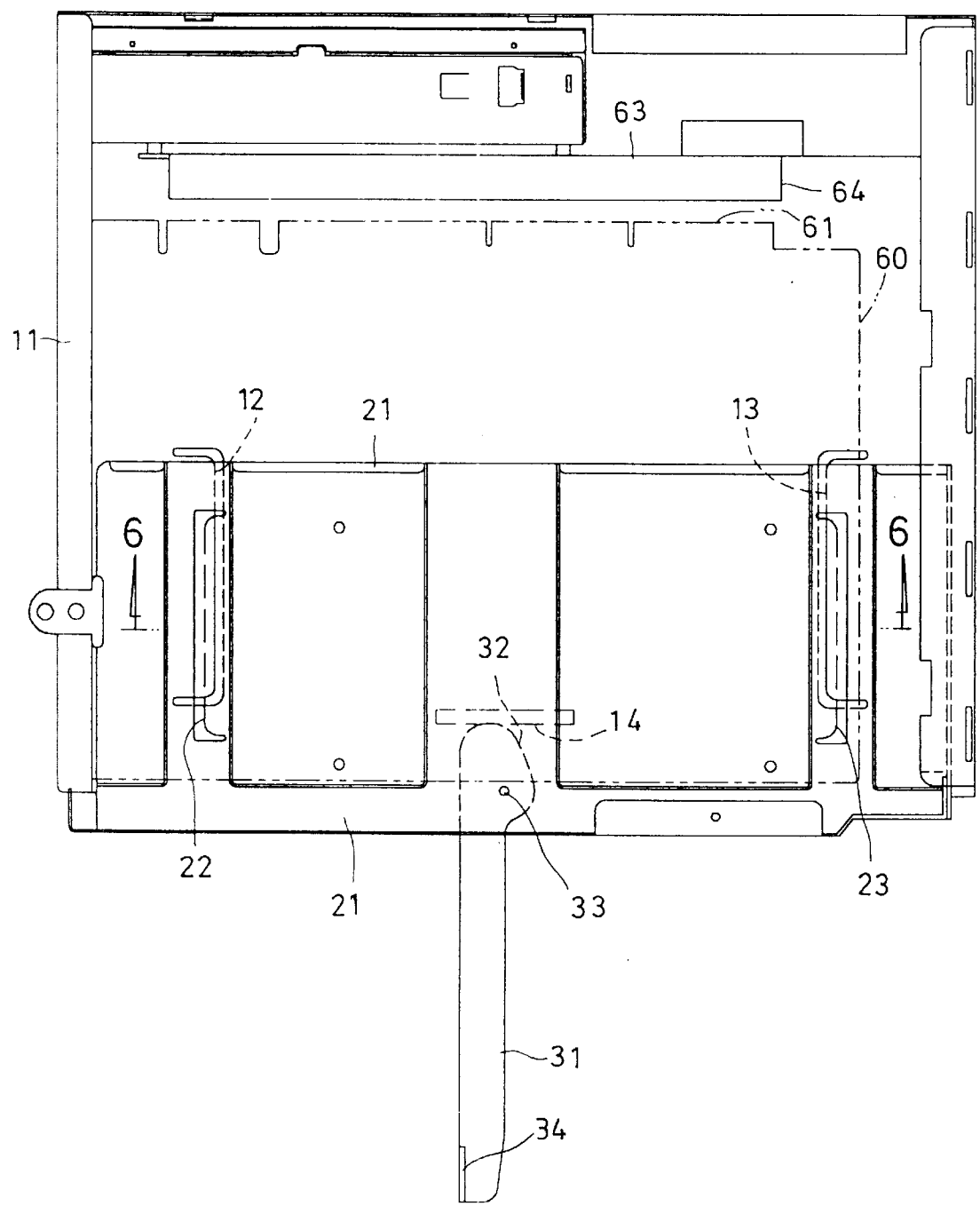
FIG. 5 is a top view showing that the main board base seat and main board of the present invention are slided out from the main base seat.
Figure 6:
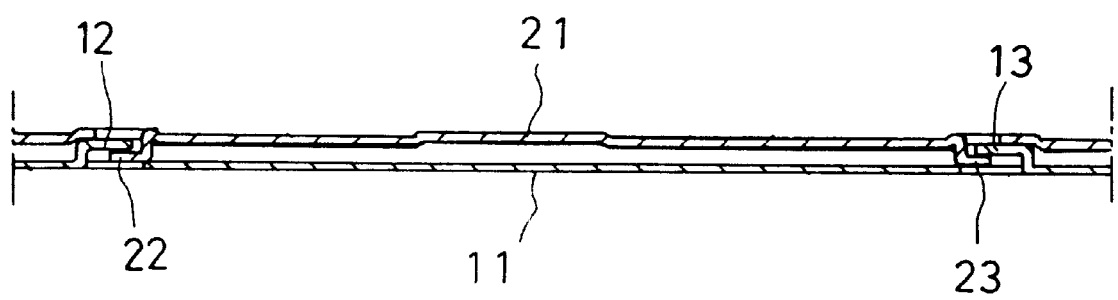
FIG. 6 is a sectional view taken along line 6—6 of FIG. 5.

Referring to FIGS. 4 to 7, the bottom face of the main board base seat 21 is formed with second guide channels 22, 23 integrally interconnected with each other (as shown in FIG. 6). The second guide channels 22, 23 of the main board base seat are slidably fitted with the first guide channels 12, 13 of the main base seat 11, whereby the main board base seat 21 is movable relative to the main base seat 11. A computer main board is secured on the main board base seat 21. One side of the main board base seat 21 is formed with a fourth upright board 24 having third latch slots 25.

As shown in FIGS. 4 to 7, the shifting lever 31 is pivotally disposed on the bottom face of the main board base seat 21. The shifting lever 31 has a cam section 32. In a non-operation position, the shifting lever 31 is hidden under the bottom face of the main board base seat 21, while in an operation position, the shifting lever 31 is moved out from the bottom face of the main board base seat 21. At this time, the cam section 32 presses the stopper section 14 of the main base seat 11 to force the main board base seat 21 to move out of the main base seat 11. Under such circumstance, the insertion section 61 of inner end of the main board 60 secured on the main board base seat 21 can be easily extracted out from the connector 64 of the upright printed circuit board 63. At this time, the computer main board can be easily disassembled or a promotion or replacement can be easily performed.

Figure 9:
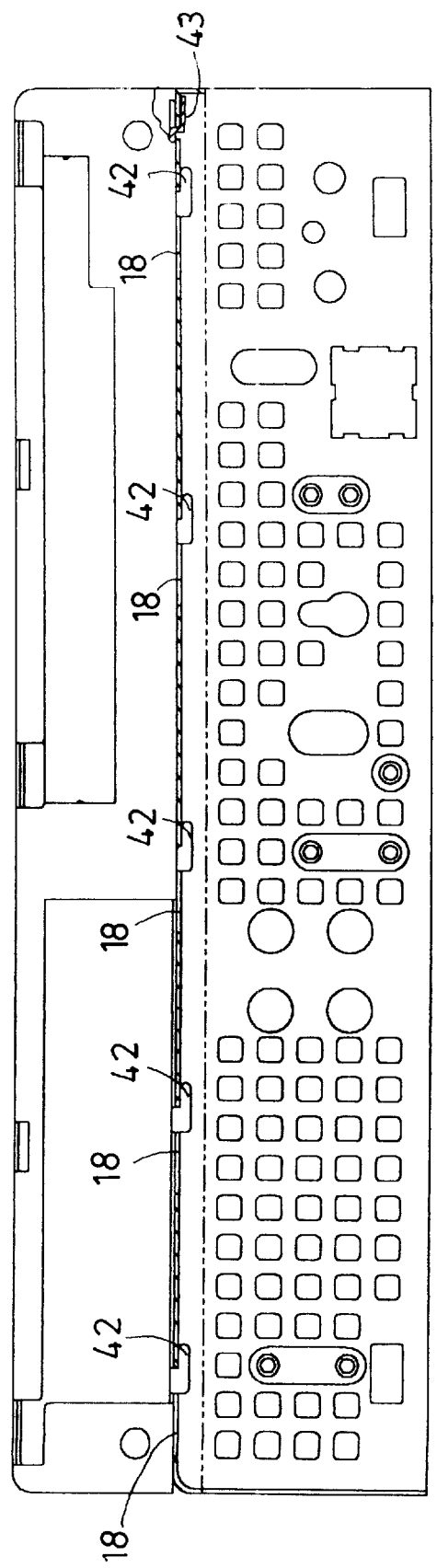
FIG. 9 is a sectional view taken along line 9—9 of FIG. 8.

As shown in FIGS. 4 and 9, one edge of the base frame 41 is disposed with latch hooks 42 latched in the latch slots 18 of the first flange 17 of the first upright board 15. Another edge of the base frame 41 is disposed with latch forks 43 clamping the upper and lower faces of the second flange 19 of the second upright board 16 so as to mount the base frame 41 on the first and second upright boards 15, 16 of the main base seat 11.

Figure 10:
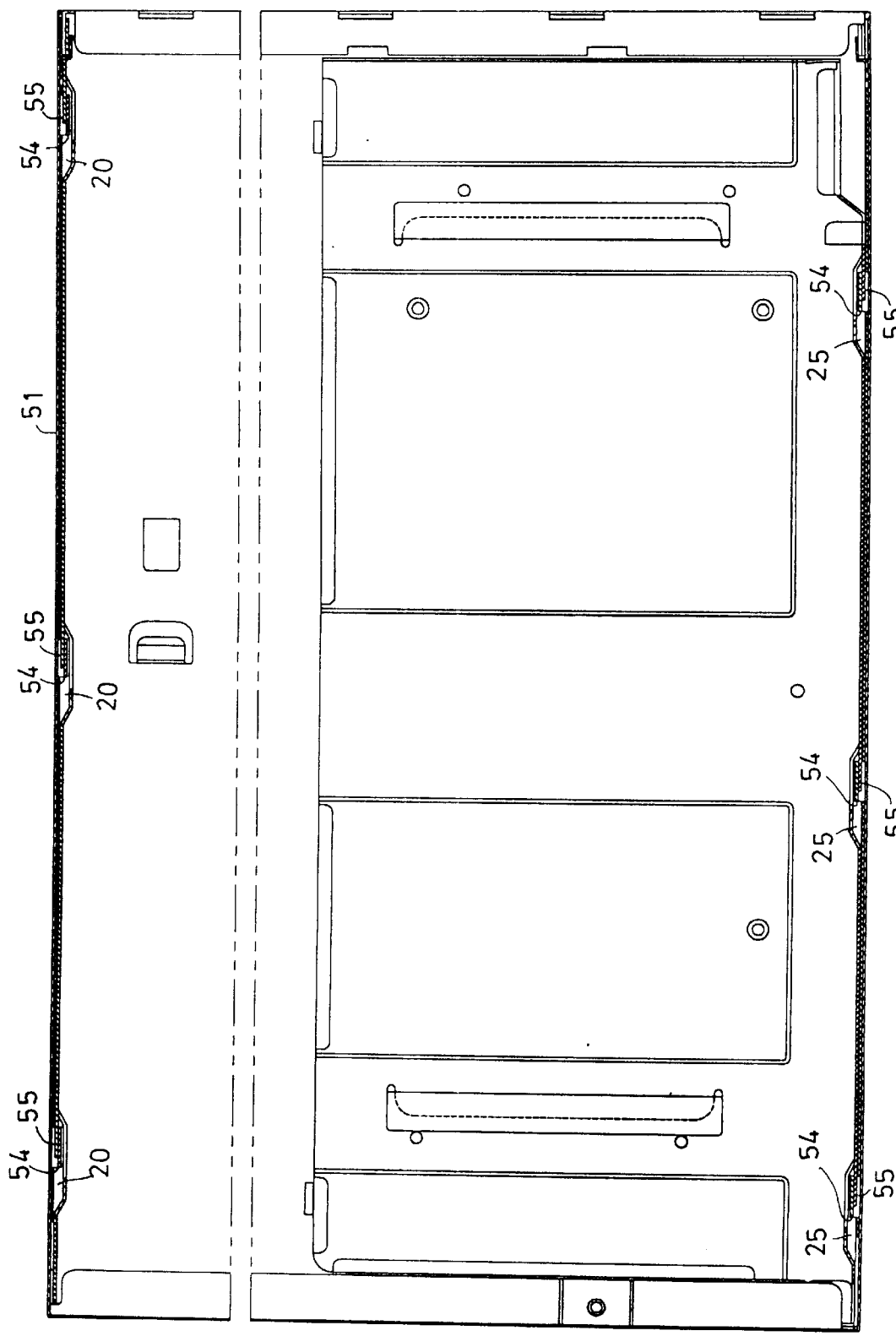
FIG. 10 is a top section al view of the present invention is a completely assembled state.

As shown in FIGS. 4 and 10, the case cover 51 includes a board body 52 and fifth upright boards 53 downward extending from two opposite sides of the board body 52 to form a U-shaped cover body. An inner side of the fifth upright board 53 is disposed with latch hooks 54 for respectively hooking and latching with the second latch slots 20 of the second upright board 16 of the main base seat 11 and the third latch slots 25 of the fourth upright board 24 of the main board base seat 21.

Figure 7:
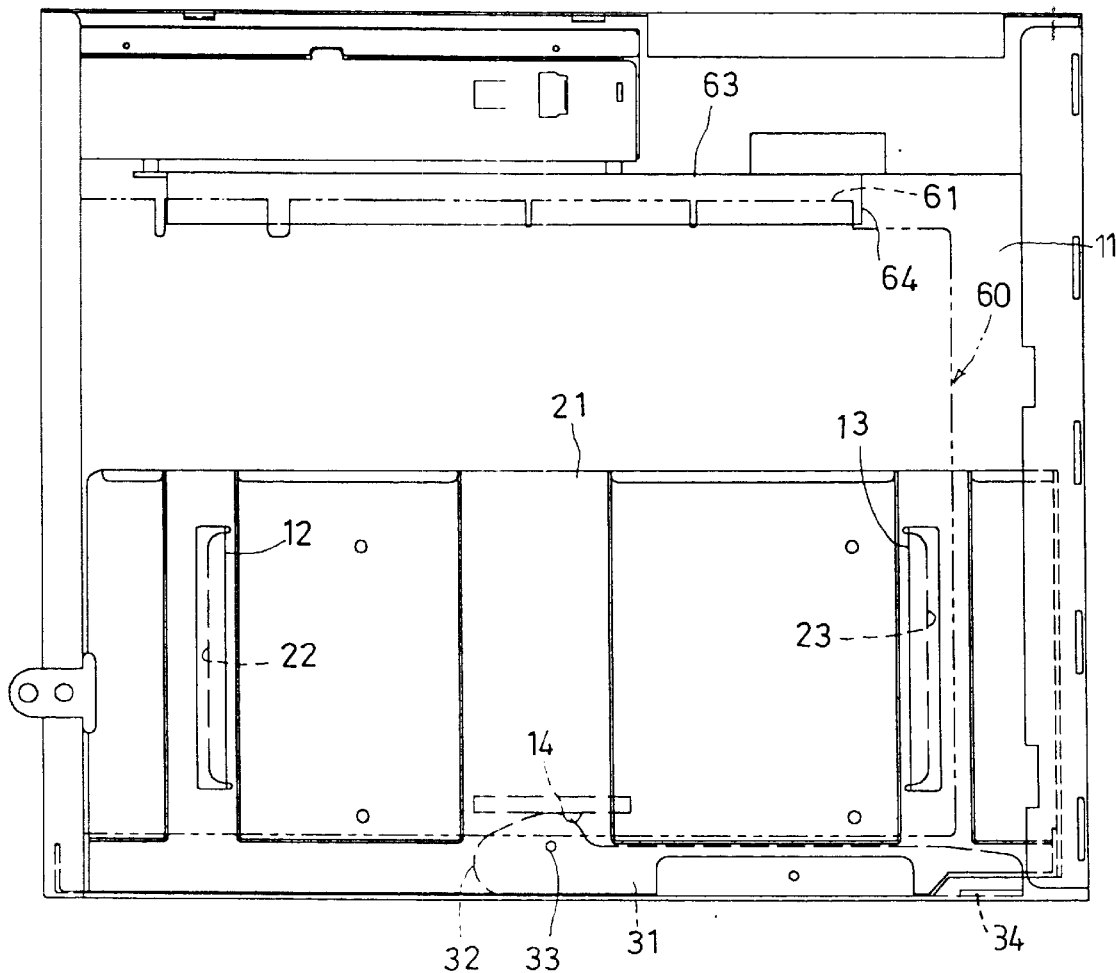
FIG. 7 is a top view showing that the main board base seat and main board of the present invention are slided into the main base seat.

As shown in FIGS. 4, 5 and 7, when replacing the main board 60, a user can hook and shift out a pulling section 34 of the shifting lever 31 with his finger and clockwisely rotate the shifting lever 31 about a pivot pin 33. When the shifting lever 31 is shifted out of the bottom face of the main board base seat 21, the cam section 32 presses the stopper section 14 of the main base seat 11, forcing the main board base seat 21 to move out from the main seat 11. Under such circumstance, the insertion section 61 of inner end of the main board 60 secured on the main board base seat 21 can be easily extracted out from the connector 64 of the upright printed circuit board 63. At this time, the computer main board can be easily disassembled or a promotion or replacement can be easily performed.

Figure 8:
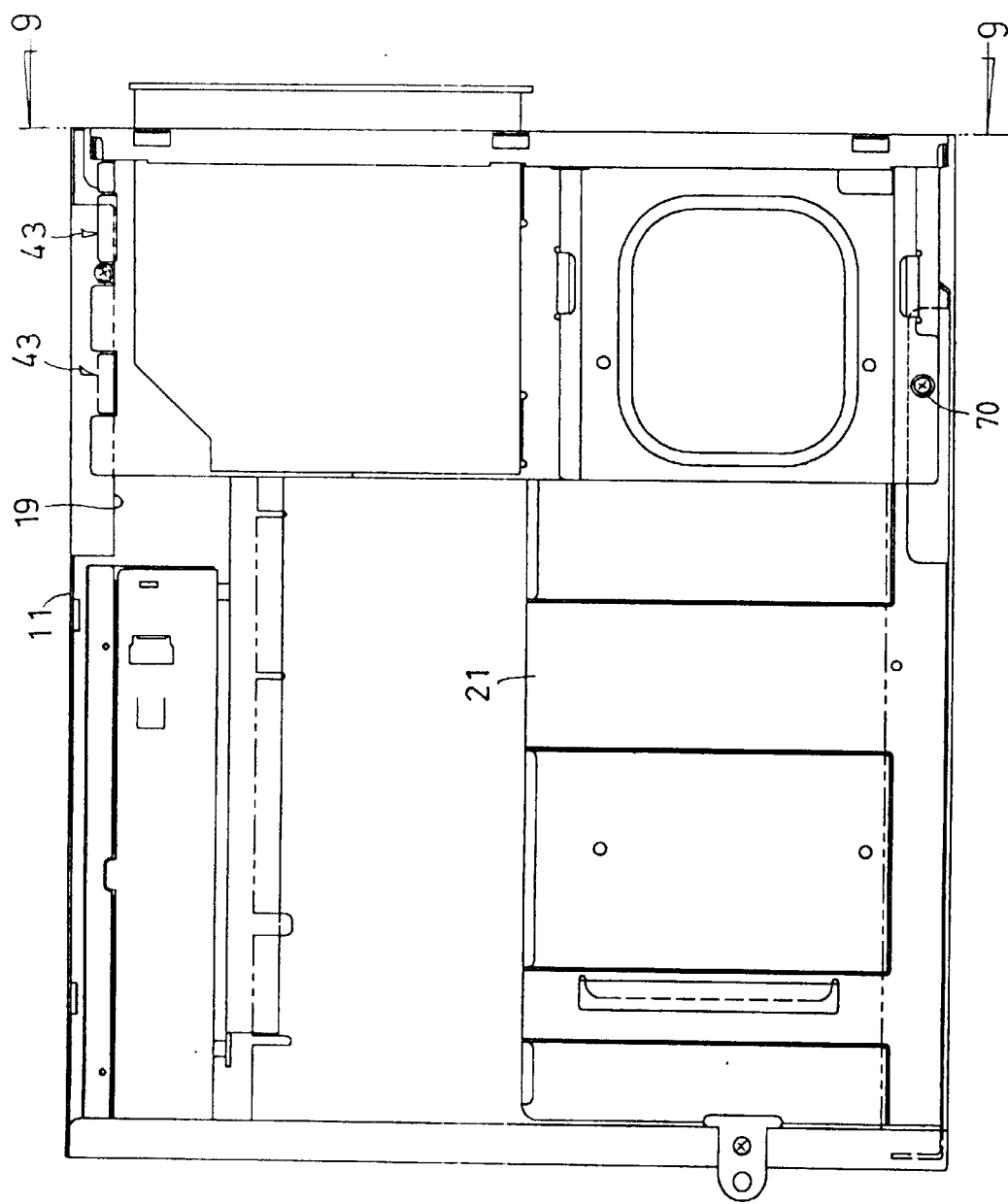
FIG. 8 is a top partially assembled view of the present invention.

As shown in FIGS. 4, 8 and 9, when mounting the base frame 41, the latch hooks 42 of the edge of the base frame 41 are respectively aligned with and hooked into the latch slots 18 of the first flange 17. Then the latch forks 43 of the other edge of the base frame 41 are aligned with the upper and lower faces of the second flange 19. Then the base frame 41 is pushed toward the second upright board 16 so as to respectively latch the latch hooks 42 into the latch slots 18 of the first flange 17. At the same time, the latch forks 43 of the other edge of the base frame 41 fixedly clamp the upper and lower faces of the second flange 19 of the second upright board 16. Then the flanges 45 of two sides of the floppy disc cover 44 are slided into the slide slots 46 of the base frame 41 and fixed thereon. Finally, screws 70 are sequentially downward passed through the through holes 71 of the floppy disc cover 44 and through holes 72 of the base frame 41 and tightened in the locking holes 73 of the fourth upright board 24 of the base seat 21. Accordingly, the base frame 41 is firmly locked and even when suffering shocking, the base frame 41 is prevented from detaching.

When disassembled, the screws 70 are untightened and the base frame 41 is backward pulled out toward the second upright board 16 for easy disassembly.

As shown in FIGS. 4 and 10, when mounting the case cover 51, the latch hooks 54 of inner sides of the fifth upright boards 53 of two sides of the case cover 51 are respectively hooked and latched in the second latch slots 20 of the second upright board 16 of the main base seat 11 and the third latch slots 25 of the fourth upright board 24 of the main board base seat 21. The latch hooks 54 is further engaged with and fixed by the resilient hooks 55 in the latch slots without upward detachment. Finally, screws 56 are passed through the through holes 57 of the case cover 51 and screwed into the thread holes 58 of the third upright board 26 of the main base seat 11 so as to completely secure the case cover 51.

The computer main board case of the present invention has the following advantages:

1. By means of the leverage of the shifting lever 31, the main board base seat 21 can be shifted out from the main base seat 11 with less strength. Therefore, the insertion section 61 of inner end of the main board 60 secured on the main board base seat 21 can be easily extracted out from the connector 64 of the upright printed circuit board 63.

2. The first guide channels 12, 13 and the second guide channels 22, 23 are both integrally formed so that the main board base seat 21 and the main board 60 can be smoothly slided in or out.

3. The latch hooks 42 and the latch slots 18 as well as the latch forks 43 and the second flange 19 are specifically designed in cooperation with the case cover 51, so that the base frame 41 is firmly mounted on the main base seat 11 and can be easily disassembled.

4. The latch hooks 42 are respectively aligned with and latched in the latch slots 18 of the first flange 17 and the latch forks 43 clamp the upper and lower faces of the second flange 19 of the second upright board 16 so as to firmly secure the base frame 41. Finally, screws 70 are sequentially downward passed through the through holes 71 of the floppy disc cover 44 and through holes 72 of the base frame 41 and tightened in the locking holes 73 of the fourth upright board 24 of the base seat 21. Accordingly, the base frame 41 is firmly locked and even when suffering shocking, the base frame 41 is prevented from detaching.

It is to be understood that the above description and drawings are only used for illustrating one embodiment of the present invention, not intended to limit the scope thereof. Any variation and derivation from the above description and drawings should be included in the scope of the present invention.

What is claimed is:

1. A computer main board case comprising:
   a. a main base seat, a surface of the main base seat being formed with continuous first guide channels and a stopper section, lateral sides of the main base seat being disposed with a first upright board, a second upright board and a third upright board, an upper edge of the first upright board being formed with a first flange having first latch slots, the second upright board being formed with a second flange and continuous second latch slots;
   b. a main board base seat, a bottom face of the main board base seat being formed with second guide channels slidably fitted with the first guide channels, whereby the main board base seat is movable relative to the main base seat, a computer main board being secured on the main board base seat, one side of the main board base seat being formed with a fourth upright board having third latch slots;
   c. a shifting lever pivotally disposed on the bottom face of the main board base seat, the shifting lever having a cam section, in a non-operation position, the shifting lever being hidden under the bottom face of the main board base seat, while in an operation position, the shifting lever being moved out from the bottom face of the main board base seat with the cam section pressing the stopper section of the main base seat to force the main board base seat to move out of the main base seat;
   d. a base frame, one edge of the base frame being disposed with latch hooks latched in the latch slots of the first flange of the first upright board, another edge of the base frame being disposed with latch forks clamping the upper and lower faces of the second flange of the second upright board so as to mount the base frame on the first and second upright boards of the main base seat; and
   e. a case cover including a board body and fifth upright boards downward extending from two opposite sides of the board body to form a U-shaped cover body, an inner side of the fifth upright board being disposed with latch hooks for respectively hooking and latching with the second latch slots of the second upright board of the main base seat and the third latch slots of the fourth upright board of the main board base seat.

2. A computer main board case as claimed in claim 1, wherein the two first guide channels are fixedly interconnected with each other by the main base seat.

3. A computer main board case as claimed in claim 1, wherein the two second guide channels are fixedly interconnected with each other by the main board base seat.

* * * * *